Patented July 20, 1937

2,087,466

UNITED STATES PATENT OFFICE 2,087,466

PROCESSES OF PRODUCING ACRYLIC ACID AND ITS ESTERS

Walter Bauer and Hellmuth Lauth, Darmstadt, Germany, assignors to Röhm & Haas Company, Philadelphia, Pa.

No Drawing. Application January 14, 1932, Serial No. 586,691. In Germany January 16, 1931

10 Claims. (Cl. 260—106)

Our invention has reference to acrylic acid and its esters, and more particularly consists in a new process of producing acrylic acid and its esters.

It is old to split off from beta-chlorpropionic acid esters hydrochloric acid with substances of basic character, and likewise, the use of special tertiary bases for the splitting off of hydrochloric acid from beta-chlorpropionic acid esters is old. In these cases molecular reactions occur. Now, we have found that the splitting off of hydrochloric acid from beta-chlorpropionic acid esters and beta-chlorpropionic acid can advantageously be also effected by catalysis, whereby a reaction component is dispensed with, aside from the fact that the catalyzer can be regenerated.

As catalyzers can be employed neutral materials having a large surface, e. g. activated carbon, etc. As accelerators can be used the chlorides of bi- and tri-valent metals, if the catalyzers are either wholly or partially impregnated therewith.

Preferably, the catalyzers are permitted to act on the vapors of the chlorpropionic acid compounds. The most favorable reaction temperature lies between 180° C. and 270° C.

It is also advisable to dilute the vapors of the esters and acids to be split with vapors or gases, as for instance, nitrogen or benzol, or even alcohol.

For the purpose of improving the yield, the operation is carried out with decreased pressure.

Besides beta-chlorpropionic acid esters, also mixtures of alpha and beta-chlorpropionic acid esters can be used, or likewise the corresponding acids.

The vapors leaving the reaction chamber are quickly cooled and condensed. The hydrochloric acid is then quickly drawn off. The product of condensation is fractionated and is returned into the process as unchanged initial material. The yield thus reaches 80% to 90% of the theoretical.

Example 1

Beta-chlorpropionic acid ethyl ester is vaporized, and the vapors are slowly passed in a tube over activated carbon, which is heated to a temperature of 200° to 250° C. After leaving the reaction chamber, the vapors are rapidly cooled and condensed. Meanwhile, the hydrochloric acid is drawn off. The product of condensation contains, in addition to unchanged beta-chlorpropionic acid ethyl ester 17% acrylic acid ethyl ester, which corresponds to a yield of about 20%. The acrylic acid ester is distilled off, while the beta-chlorpropionic acid ester is again passed over the catalyzer.

Example 2

39 parts of beta-chlorpropionic acid methyl ester are evaporated together with 2 to 3 parts of methanol, and the vapors are passed over activated carbon, which is heated to a temperature of 200° to 240° C. In the reaction chamber, there is a pressure of 200 to 300 millimeters. The escaping vapors are rapidly cooled, while the hydrochloric acid is drawn off. The distillate contains about 43% beta-chlorpropionic acid methyl ester and about 38% acrylic acid methyl ester, which corresponds to a yield of about 45%. The acrylic acid ester is distilled off, and the unchanged initial material is again evaporated with methanol in the same apparatus.

Example 3

80 parts of beta-chlorpropionic acid are evaporated, and the vapors are passed through about 10 parts of concentrated sulfuric acid, which is heated to a temperature of about 200° C. In the reaction mixture there is a pressure of about 20 to 40 millimeters. The acrylic acid produced is condensed, while the hydrochloric acid is distilled. The yield is about 50 to 55 g. which corresponds to an output of about 92%. The acrylic acid is purified in a well-known manner.

Example 4

100 parts of beta chlorpropionic acid ester are evaporated, and the vapors are passed over anhydrous silicic acid gel at a temperature of from 230° to 250° and a pressure of 200 to 300 millimeters. The escaping vapors are rapidly cooled, and the hydrochloric acid is distilled. From the distillate, acrylic acid ester produced is distilled off, a yield of 14% to 18% being obtained. The unchanged beta-chlorpropionic acid ester is again passed over the catalyzer.

Example 5

56 parts of beta-chlorpropionic acid are evaporated, 15 g. of benzol being added, and the vapors are passed over activated carbon. In the reaction chamber, a temperature of about 250° C. and a pressure of 10 to 100 millimeters are maintained. The escaping vapors are cooled, and the hydrochloric acid is then quickly removed. The distillate contains 70.3 to 77% acrylic acid which corresponds to a yield of 86% to 92% of the theoretical. It is separated by distillation from the unchanged beta-chlorpropionic acid which is used again.

*Example 6*

80 parts of beta-chlorpropionic acid ester are evaporated, and the vapors are passed over activated carbon, which has been impregnated with anhydrous zinc chloride. In the reaction chamber are a temperature of from 230° to 250° C. and a pressure of between 200 and 300 millimeters. The escaping vapors are passed into cold water. The distillate contains about 80% to 85% acrylic acid methyl ester, which corresponds to a yield of 82% to 86%. The acrylic acid ester is distilled off, while the unchanged chlorpropionic acid ester is used again.

We claim:

1. In the process of producing one of the group consisting of acrylic acid and aliphatic esters of acrylic acid, the step which comprises heating one of the group consisting of $\beta$-chlorpropionic acid and aliphatic esters of $\beta$-chlorpropionic acid in the presence of a neutral catalyst having a large superficial area.

2. In the process of producing one of the group consisting of acrylic acid and aliphatic esters of acrylic acid, the step which comprises heating one of the group consisting of $\beta$-chlorpropionic acid and aliphatic esters of $\beta$-chlorpropionic acid in the presence of a neutral catalyst which consists of activated carbon.

3. The process of producing one of the group consisting of acrylic acid and the aliphatic esters of acrylic acid, which comprises splitting off hydrogen chloride from one of the group consisting of $\beta$-chlorpropionic acid and aliphatic esters of $\beta$-chlorpropionic acid by means of a neutral catalyst which consists of activated carbon, in the vapor phase, condensing the vapors and removing the hydrogen chloride.

4. The process of producing acrylic acid esters of monohydric aliphatic alcohols which comprises splitting off hydrogen chloride from the corresponding ester of $\beta$-chlorpropionic acid in the presence of a neutral catalyst consisting of activated carbon, in the vapor phase, condensing the vapors and removing the hydrogen chloride.

5. The process of producing one of the group consisting of acrylic acid and the aliphatic esters of acrylic acid, which comprises splitting off hydrogen chloride from one of the group consisting of $\beta$-chlorpropionic acid and aliphatic esters of $\beta$-chlorpropionic acid by means of a neutral catalyst which consists of activated carbon, at pressures below 300 millimeters, in the vapor phase, condensing the vapors and removing the hydrogen chloride.

6. The process of producing acrylic acid esters of monohydric aliphatic alcohols which comprises splitting off hydrogen chloride from the corresponding ester of $\beta$-chlorpropionic acid in the presence of a neutral catalyst consisting of activated carbon, at pressures below 300 millimeters, in the vapor phase, condensing the vapors and removing the hydrogen chloride.

7. The process of producing one of the group consisting of acrylic acid and the aliphatic esters of acrylic acid, which comprises splitting off hydrogen chloride from one of the group consisting of $\beta$-chlorpropionic acid and aliphatic esters of $\beta$-chlorpropionic acid by means of a neutral catalyst which consists of activated carbon, at temperatures from 180 to 270° C., in the vapor phase, condensing the vapors and removing the hydrogen chloride.

8. The process of producing acrylic acid esters of monohydric aliphatic alcohols which comprises splitting off hydrogen chloride from the corresponding ester of $\beta$-chlorpropionic acid in the presence of a neutral catalyst consisting of activated carbon, at temperatures from 180 to 270° C., in the vapor phase, condensing the vapors and removing the hydrogen chloride.

9. The process of producing one of a group consisting of acrylic acid and alkyl esters thereof which comprises splitting off hydrogen chloride from the corresponding $\beta$-chlorpropionic acid compound by vaporizing it and contacting it at a temperature sufficient to effect dehydrochlorination with a neutral catalyst having a large superficial area.

10. In a process of producing acrylic acid esters of aliphatic monohydric alcohols, the step which comprises splitting off hydrogen chloride from $\beta$-chlorpropionic acid by vaporizing it and contacting the vapors thereof with a neutral catalyst of a large superficial area at a temperature sufficient to effect dehydrochlorination.

WALTER BAUER.
HELLMUTH LAUTH.